3 Sheets--Sheet 1.
L. W. STOCKWELL.
Screw-Cutting Machines.
No. 146,290. Patented Jan. 6, 1874.
Fig. 1.
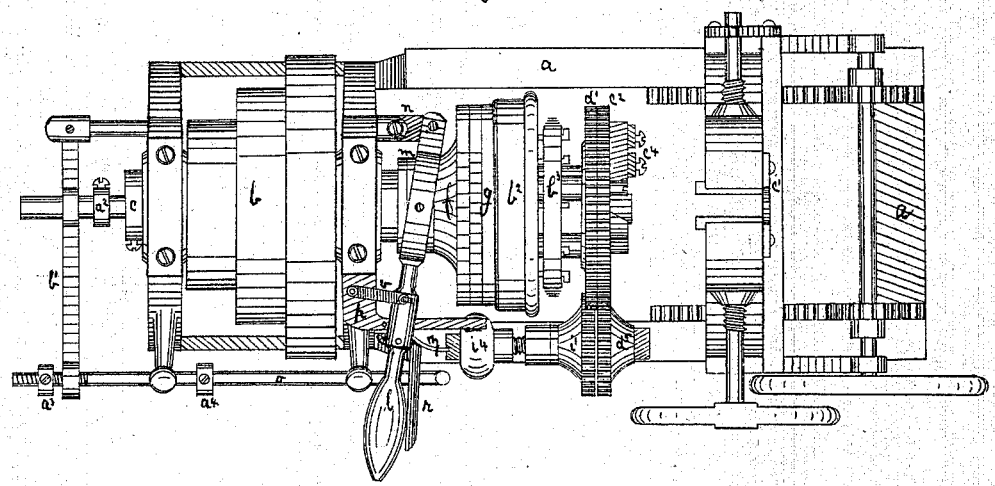
Fig. 3.     Fig. 6.     Fig. 2.
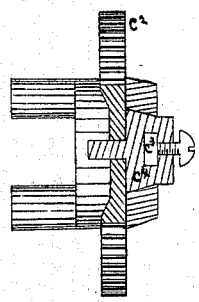 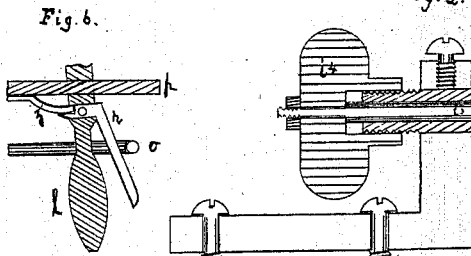
Fig. 4.     Fig. 7.     Fig. 9.   Fig. 10.   Fig. 11.
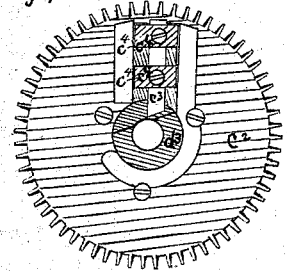  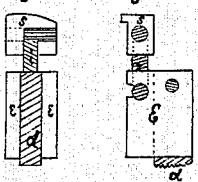
Levi W. Stockwell
by Bradford Howland
his Attorney.
A. B. Griffin
Benj. J. Wells L. W. STOCKWELL.
Screw-Cutting Machines.
No. 146,290.
3 Sheets--Sheet 2.
Patented Jan. 6, 1874.
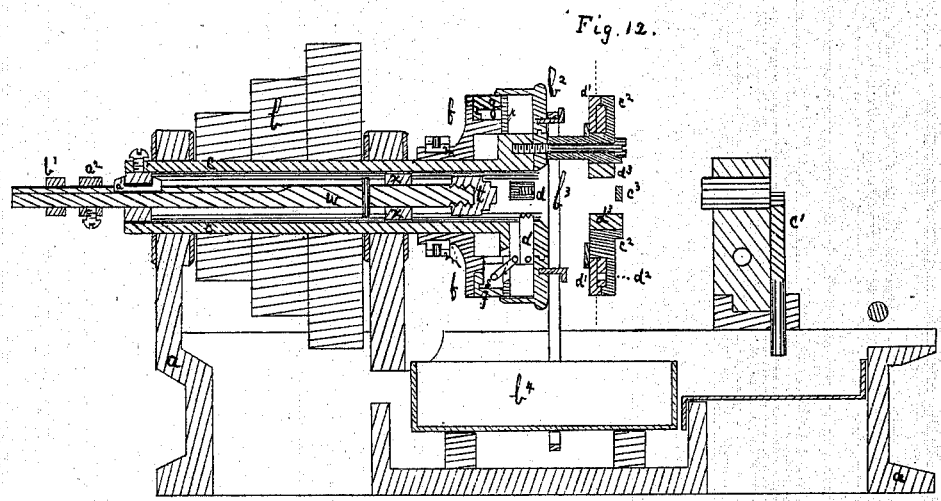
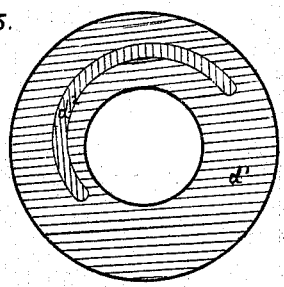
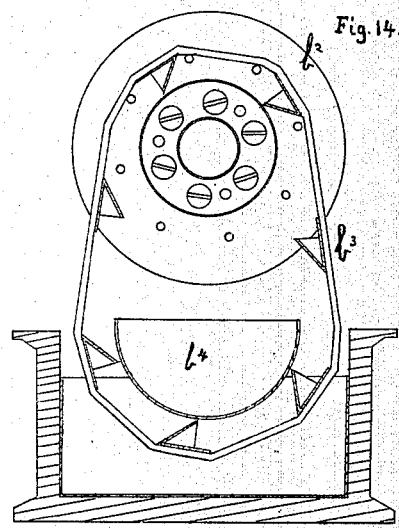
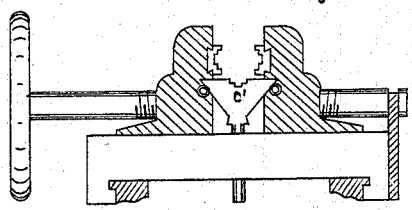

L. W. STOCKWELL.
Screw-Cutting Machines.

No. 146,290.  Patented Jan. 6, 1874.

UNITED STATES PATENT OFFICE.

LEVI W. STOCKWELL, OF RAVENNA, OHIO.

IMPROVEMENT IN SCREW-CUTTING MACHINES.

Specification forming part of Letters Patent No. 146,290, dated January 6, 1874; application filed August 4, 1873.

*To all whom it may concern:*

Be it known that I, LEVI W. STOCKWELL, of Ravenna, in the county of Portage and State of Ohio, have invented an Improved Bolt-Threading Machine, of which the following is a specification:

The principal features of novelty are, that bolts are first sharpened and then threaded without stopping the machine; second, the manner of automatically adjusting the bolt between the vise-jaws; third, automatically lubricating the bolt, while being threaded, by means of a revolving oiling-belt with buckets.

The principal parts of the machine, with some changes in their arrangement, and additions thereto, are designed for use as a nut-tapping machine, for which an application for a patent has been filed, and also for a gas-pipe-fitting machine, embracing substantial elements of this machine, for which an application for a patent has been filed.

Figure 15:
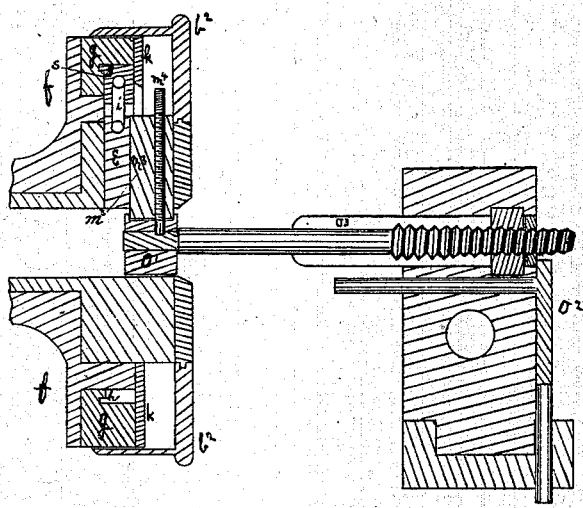
Figure 16:
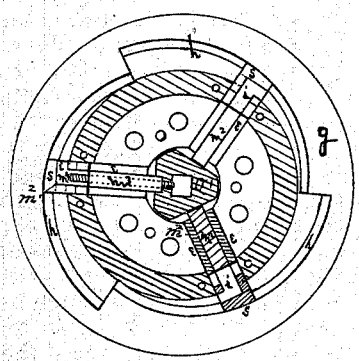

Figure 1 is a top view of the machine. Figs. 2, 3, 4, and 5 are plans of the attachment for cutting off gas-pipe. Figs. 6, 7, and 8 are plans. Figs. 9, 10, and 11 illustrate the combination of the dies, die-cases, strut-levers, and seats. Fig. 12 is a sectional elevation of the machine. Fig. 13 is an end view of the bolt-holder. Fig. 14 is a sectional plan of the oiling device. Figs. 15 and 16 are sectional plans of parts used in tapping nuts.

$a$ is the frame of the machine. $b$ is the driving-pulley on the hollow shaft $c$. On the front end of the hollow shaft is the cutter-head containing the dies $d\ d\ d$, which are held by pins in their cases $e\ e\ e$. Around the cutter-head is the sliding collar $f$, which revolves with the cutter-head, and is made to slide on it to open and close the dies. The sliding collar is surrounded by the ring $g$, which moves with the collar to open and close the dies, and has as many cams as there are dies. The die-cases $e\ e\ e$ are connected with the ring $g$ by the strut-levers $i\ i\ i$ and the lever-seats $s\ s\ s$. Flanges on the lever-seats enter the grooves $h\ h\ h$ in the ring $g$, so that, when the ring is turned on the collar, the lever-seats, strut-levers, die-cases, and dies are moved toward or from the center of the cutter-head by the cams in the ring, and thus the dies are adjusted to different-sized bolts or gas-pipe. The outer ends of the strut-levers $i\ i\ i$ turn in the seats, and the inner ends turn in the die-cases. The form of the levers, seats, die-cases, and dies, and the manner in which they are combined, are shown in Figs. 9, 10, and 12. There is a Vernier scale on the circumference of the ring $g$, and a corresponding scale adjoining it on the sliding collar $f$, which are marked with letters or figures to indicate the adjustment of the dies. The scales are shown, but not marked with letters or figures, in Fig. 1. Grooves for the die-cases and seats are cut in the cutter-head and flange of the sliding collar. The face-plate $k$ is screwed fast to the front end of the sliding collar $f$, to hold the ring $g$ and seats, so that they may be moved by the collar in opening and closing the dies. The collar is made to slide on the cutter-head by the lever $l$, which is pivoted on opposite sides of the collar to the ring $m$, which rests in a groove around the collar, and in which the collar revolves. The lever $l$ has its fulcrum in the link $n$, attached to the frame of the machine. The sliding rod $o$ passes under the handle of lever $l$ through projections of the frame. The arm $p$ is attached to the frame and passes through a slot in lever $l$, and supports the handle of the lever. A spring, fastened to the arm $p$, passes through the slot in lever $l$, and presses against the end of the small lever $r$, which is pivoted in the slot. The lever $r$ has a notch near its end in the slot, for the end of the spring $z$ to catch against and hold lever $l$ when the lever $l$ is moved forward to close the dies. When the handle of lever $r$ is pressed toward the handle of lever $l$, the end of lever $r$ presses the spring $z$ out of the notch, and then the spiral spring $v$ draws back lever $l$, and opens the dies. One end of the spiral spring $v$ is attached to the arm $p$ and the other end to lever $l$. The combination of levers $l$ and $r$, and the arm $p$, and the spring are shown in Fig. 6. A pin, through the arm $p$, behind the lever $l$, prevents the lever from being carried back by the spiral spring farther than necessary to open the dies; but when the dies are to be removed and changed for others this pin is removed so as to permit the spiral spring to carry back the lever $l$ and sliding collar until the dies are drawn out, so that the pins through the die-cases are outside of the cutter-head. These die-case pins are then taken out, and the dies removed.

When the machine is in operation the pins through the die-cases are kept in place by the sides of the grooves through the cutter-head; but the dies are very easily removed by simply pushing the pins out, when the die-cases are opened sufficiently to bring the pins outside of the cutter-head. When the dies are closed the strut-levers are perpendicular to the axis of the cutter-head. The bolt-sharpener $w'$ is screwed fast to the front end of the rod $w$ in the place of the gas-pipe reamer $t$, Fig. 12, and is used to sharpen or smooth the ends of bolts. $x$ is a loose collar, in which the rod $w$ slides, and is used to hold the sharpener $w'$ in the center of the cutter-head. To keep the collar $x$ in place there is a pin just back of it through the rod $w$. The sharpener is made to revolve with the cutter-head by the key or feather $a^1$, which is in a groove in the rod $w$ and a groove in a collar held by a set-screw in the end of the hollow shaft $c$. The sharpener $w'$ is shown in Fig. 8, and a section of the end of the hollow shaft $c$ in Fig. 7. The rods $w$ and $o$ slide in the lever $b^1$. The collar $a^2$ on rod $w$, Fig. 12, and the collars $a^3$ and $a^4$ on rod $o$, Fig. 1, are adjusted by their set-screws so that when the thread on a bolt is cut as far as required, the end of the bolt, pressing back the sharpener, causes the collar $a^2$ to press back the lever $b^1$, which presses against collar $a^3$ and draws back the rod $o$, until its front end, which is turned up, presses back the handle of lever $r$, when the lever $l$ is thrown back by the spiral spring and the dies are opened. Before it is threaded the bolt is sharpened, or its end chamfered, as follows: The dies are opened and the bolt-holder moved by hand, causing the bolt to press back the sharpener until the collar $a^4$ presses against the projection through which the rod $o$ passes, thereby arresting the backward movement of the sharpener so that the bolt may be pressed against it and the end of the bolt sharpened. The cap $b^2$ surrounds the cutter-head and projects over a portion of the sliding collar to cover the dies and strut-levers. It is held in its position, but so as to be easily removed and replaced, by slight pins or projections on the circumference of the cutter-head, which enter a groove in the cap. The pins projecting from the front of the cap carry the oiling-belt $b^3$, with its buckets, which passes under the vessel $b^4$ and through the oil-reservoir. A sectional view of the oiling device is shown in Fig. 14. The vessel $b^4$ catches and holds the cuttings and has holes in it to let the oil escape into the reservoir beneath. The buckets are attached to the side of the belt nearest to the center of the cutter-head, and in their revolution with the cutter-head lift and pour the oil onto the bolt or gas-pipe to oil it while it is being threaded. The bolt-adjuster $c^1$, Fig. 13, supports bolts of different sizes in such a position that the center of the bolt is always exactly between the centers of the vise-jaws, while the jaws are being closed to hold it. Its sides or edges rest on two pins, one in each side of the vise, and are at an angle of forty-five degrees to the top, which is horizontal, thus causing it, when the jaws are being closed, to rise as fast as each jaw moves toward the other. It is guided by its lower end passing through a hole in the frame in which each side of the vise moves. The sides of the vise are moved by right-and-left-hand screws, which are turned by a hand-wheel. The vise with its frame is moved to and from the cutter-head, in the ordinary manner, by means of cog-wheels turning on ways in the frame of the machine, turned by a hand-wheel.

I am aware that die-cases for holding dies are not new, but those heretofore used are materially different from mine in their construction and combination with other parts of a bolt-threading machine in the following particulars. The die-cases $e\ e\ e$ are open at the outer ends, so that the dies may be drawn out from the ends of their cases. A loose or movable pin passes through a hole in the die-case and die, which pin is kept in position while the machine is in operation by the sides of the groove in which the die-case moves, but may be drawn outside of the cutter-head by means of the sliding collar $f$ and the strut-levers, so that it may be pushed out of the die-case and die, and then the die may be drawn out endwise from its case. Without this loose movable pin, whose length is the thickness of the die-case and die, the die could not be taken out.

In my bolt-threading machine patented February 20, 1872, the strut-levers were connected directly with the dies, but by connecting them with the die-cases they have greater bearing-surface and strength by reason of the greater thickness of the die-cases, and the dies are simpler and cheaper in construction.

The machine which I have herein described, so far as it relates to the threading of bolts, is an improvement on my bolt-threading machine patented February 20, 1872.

I claim as my invention—

1. The combination of the strut-levers $i\ i\ i$, die-cases $e\ e\ e$, dies $d\ d\ d$, and the pins for retaining the dies in their cases, substantially as described.

2. The lever $l$, in combination with the lever $r$, arm $p$ and its spring, the spiral spring $v$, the link $n$, the ring $m$, and sliding collar $f$, substantially as described.

3. The combination of the lever $l$, lever $r$, arm $p$ and its spring, the spiral spring $v$, the link $n$, the ring $m$, the sliding collar $f$, the sharpener $w'$, the rod $w$, the collars $x$ and $a^2$, the feather $a^1$, lever $b^1$, the rod $o$, and the collars $a^3$ and $a^4$, substantially as described.

4. The oiling-belt $b^3$, with its buckets, in combination with the vessel $b^4$ and oil-reservoir beneath, and the projections on the revolving cutter-head which support and carry the belt, substantially as described.

5. The combination of the bolt-adjuster $c^1$ and its supporting-pins with the vise which holds the bolts, substantially as described.

LEVI W. STOCKWELL.

Witnesses:
GEO. F. ROBINSON,
BRADFORD HOWLAND.